US011443444B2

(12) United States Patent
Hoiem et al.

(10) Patent No.: US 11,443,444 B2
(45) Date of Patent: Sep. 13, 2022

(54) INTERIOR PHOTOGRAPHIC DOCUMENTATION OF ARCHITECTURAL AND INDUSTRIAL ENVIRONMENTS USING 360 PANORAMIC VIDEOS

(71) Applicant: RECONSTRUCT INC., Menlo Park, CA (US)

(72) Inventors: Derek Hoiem, Urbana, IL (US);
Shengze Wang, Champaign, IL (US);
Abhishek Bhatia, Champaign, IL (US)

(73) Assignee: Reconstruct, Inc., Menlo Park, CA (US)

( * ) Notice: Subject to any disclaimer, the term of this patent is extended or adjusted under 35 U.S.C. 154(b) by 0 days.

(21) Appl. No.: 17/304,534

(22) Filed: Jun. 22, 2021

(65) Prior Publication Data
US 2021/0343032 A1 Nov. 4, 2021

Related U.S. Application Data

(62) Division of application No. 16/948,955, filed on Oct. 7, 2020, now Pat. No. 11,074,701.
(Continued)

(51) Int. Cl.
*G06T 7/33* (2017.01)
*G06T 7/73* (2017.01)
(Continued)

(52) U.S. Cl.
CPC .............. *G06T 7/33* (2017.01); *G06T 3/0068* (2013.01); *G06T 3/20* (2013.01); *G06T 3/40* (2013.01);
(Continued)

(58) Field of Classification Search
CPC . G06T 7/73; G06T 3/40; G06T 11/203; G06T 17/00; G06T 19/20;
(Continued)

(56) References Cited

U.S. PATENT DOCUMENTS

| 7,583,275 B2 | 9/2009 | Neumann et al. |
| 9,031,283 B2 * | 5/2015 | Arth .......................... G06T 7/80 |
| | | 382/103 |

(Continued)

FOREIGN PATENT DOCUMENTS

WO 2014/197104 A2 12/2014

OTHER PUBLICATIONS

International Preliminary Report on Patentability dated Dec. 7, 2021, from the IPEA/European Patent Office, for International Patent Application No. PCT/US2020/063830 (filed Dec. 8, 2020), 15 pgs.

(Continued)

*Primary Examiner* — David T Welch
(74) *Attorney, Agent, or Firm* — Ascenda Law Group, PC

(57) ABSTRACT

A 360 panoramic video sequence of an architectural or industrial site includes a plurality of 360 images. 3D poses of the 360 images are determined with respect to one another, and a subset of the images extracted for further processing according to selection criteria. The 3D poses of the extracted images is refined based on determined correspondences of the features in the images, and a 3D point cloud of the site is developed from the extracted images with refined pose estimates. An "as-built" representation of the site captured in the panoramic video sequence is created from the sparse 3D point cloud and aligned to a 2D or 3D plan of the site. Once so aligned, the extracted images may be presented to a user in conjunction with their plan positions (e.g., overlayed on the site plan). Optionally, a point cloud or mesh view of the site may also be returned.

15 Claims, 12 Drawing Sheets
(8 of 12 Drawing Sheet(s) Filed in Color)

Related U.S. Application Data

(60) Provisional application No. 62/947,660, filed on Dec. 13, 2019.

(51) Int. Cl.
| | |
|---|---|
| *G06T 7/246* | (2017.01) |
| *G06T 3/00* | (2006.01) |
| *G06T 3/60* | (2006.01) |
| *G06T 11/20* | (2006.01) |
| *G06T 3/20* | (2006.01) |
| *G06T 3/40* | (2006.01) |
| *G06T 17/00* | (2006.01) |
| *G06T 19/20* | (2011.01) |
| *H04N 5/232* | (2006.01) |

(52) U.S. Cl.
CPC ............ *G06T 3/60* (2013.01); *G06T 7/246* (2017.01); *G06T 7/73* (2017.01); *G06T 11/203* (2013.01); *G06T 17/00* (2013.01); *G06T 19/20* (2013.01); *H04N 5/23238* (2013.01); *G06T 2207/10016* (2013.01); *G06T 2207/10028* (2013.01); *G06T 2207/30204* (2013.01); *G06T 2210/04* (2013.01); *G06T 2219/2004* (2013.01); *G06T 2219/2016* (2013.01)

(58) Field of Classification Search
CPC . G06T 2207/10016; G06T 2207/10028; G06T 2219/2004; G06T 2219/2016
See application file for complete search history.

(56) References Cited

U.S. PATENT DOCUMENTS

| | | | |
|---|---|---|---|
| 9,558,559 B2 | 1/2017 | Fan et al. | |
| 9,699,375 B2 | 7/2017 | Fan et al. | |
| 10,284,794 B1* | 5/2019 | Francois | H04N 5/3415 |
| 10,395,117 B1 | 8/2019 | Zhang et al. | |
| 10,529,142 B2* | 1/2020 | Bell | H04N 13/106 |
| 10,776,902 B2 | 9/2020 | Bergen et al. | |
| 10,812,711 B2 | 10/2020 | Sapienza et al. | |
| 10,825,246 B2 | 11/2020 | Lukau et al. | |
| 2008/0310757 A1 | 12/2008 | Wolber et al. | |
| 2011/0181589 A1* | 7/2011 | Quan | G06T 17/05 345/420 |
| 2013/0155058 A1 | 6/2013 | Golparvar-Fard et al. | |
| 2014/0016821 A1 | 1/2014 | Arth et al. | |
| 2014/0225922 A1* | 8/2014 | Sbardella | G06T 19/20 345/633 |
| 2015/0310135 A1 | 10/2015 | Forsyth et al. | |
| 2019/0026958 A1* | 1/2019 | Gausebeck | H04N 13/246 |
| 2019/0325089 A1 | 10/2019 | Golparvar-Fard et al. | |
| 2020/0105059 A1* | 4/2020 | Lukác | G06F 16/29 |

OTHER PUBLICATIONS

De Cubber; et al., "Combining Dense Structure From Motion and Visual SLAM in a Behavior-Based Robot Control Architecture", International Journal of Advanced Robotics Systems (2010), vol. 7, No. 1, pp. 027-038.

Degol; et al., "FEATS: Synthetic Feature Tracks for Structure from Motion Evaluation," 2018 International Conference on 3D Vision (3DV), pp. 352-361 (2018).

Degol; et al., "Improved Structure from Motion Using Fiducial Marker Matching," 2018 Springer European Conference on Computer Vision (ECCV '18), pp. 273-288 (2018).

Fard, Mani Golparavar, "D4AR-4 Dimensional Augmented Reality—Models for Automation and Interactive Visualization of Construction Progress Monitoring", University of Illinois PhD Dissertation, 2010, 217 pgs.

Furlan; et al., "Free your Camera: 3D Indoor Scene understanding from Arbitrary Camera Motion," Proceedings British Machine Vision Conference 2013, pp. 24.1-24.12 (2013).

Huang; et al., "A Survey of Simultaneous Localization and Mapping", ARXIV.org, Cornell University Library, Ithaca, NY, Aug. 24, 2019, arXiv:1909.05214v3 [cs.RO] Jan. 1, 2020, 13 pgs.

International Search Report and Written Opinion dated Apr. 6, 2021, from the ISA/European Patent Office, for International Patent Application No. PCT/US2020/063830 (filed Dec. 8, 2020), 21 pgs.

Kaminsky; et al., "Alignment of 3D Point Clouds to Overhead Images", 2009 IEEE Computer Society Conference on Computer Vision and Pattern Recognition Workshops (2009), 8 pgs.

Lemaire; et al., "SLAM with Panoramic Vision", Journal of Field Robotics (Jan. 1, 2007), 24(1-2):91-111.

Li; et al., "Spherical-Model-Based SLAM on Full-View Images for Indoor Environments", Applied Sciences 8(11)::2268, Nov. 2018, 16 pgs.

Lowe, David G., "Distinctive Image Features from Scale-Invariant Keypoints," Int'l J. Computer Vision (Jan. 5, 2004), 28 pgs.

Pagani; et al., "Structure from Motion using full spherical panoramic cameras", 2011 IEEE International Conference on Computer Vision Workshops (ICCV Workshops) (2011), 8 pgs.

Saputra; et al., "Visual SLAM and Structure from Motion in Dynamic Environments: A Survey", ACM Computing Surveys (Feb. 2018), vol. 51, No. 2, Article 37, 36 pgs.

Stamos, "Geometry and Texture Recovery of Scenes of Large Scale", Computer Vision and Image Understanding (2002), 88(2):94-118.

Von Gloi; et al., "LSD: a Line Segment Detector," Image Processing On Line, 2 pp. 35-55 (2012) (available at http://dx.doi.org/10.5201/ipol.2012.gjmr-lsd).

Yao; et al., "MVSNet: Depth Inference for Unstructured Multi-view Stereo," 2018 Springer European Conference on Computer Vision (ECCV '18), pp. 767-783 (2018).

Yousif; et al., "An Overview to Visual Odometry and Visual SLAM: Applications to Mobile Robotics", Intelligent Industrial Systems (2015), 1(4):289-311.

\* cited by examiner

(a)
(b)
(c)
(d)
FIG. 3

(a)
(b)
(c)
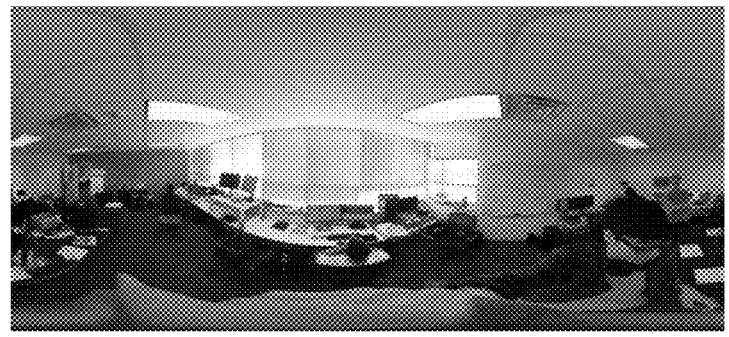
(d)
FIG. 4

1) Extract two sets of orthogonal lines from each of the as-built drawing and plan drawing
2) For each of four orientations $\theta \in 0, 90, 180, 270$ degrees:
   a) Convert sets to ordered lists $(X^B, Y^B)$ and $(X^P, Y^P)$ based on orientation
   b) For each of indices $(i,j)$ s.t. $j > i$ and $(m,n)$ s.t. $n > m$: $C_{xijmn}, t_{xijmn}, s_{xijmn} =$ correspondence_cost$(X^B, X^P, i, j, m, n)$
   c) For each of indices $(a,b)$ s.t. $b > a$ and $(c,d)$ s.t $d > c$: $C_{yabcd}, t_{yabcd}, s_{yabcd} =$ correspondence_cost$(Y^B, Y^P, a, b, c, d)$
   d) Select $T(\theta) = t_x, t_y, s$ such that $s_x \approx s_y$ and $C_x + C_y$ is minimized
3) Select $T = \{\theta, t_x, t_y, s\}$ over all $\theta$ with minimum cost
4) Perform ICP to refine transformation based on distance of points from as-built segments to points in plan drawing segments 1: procedure CORRESPONDENCE_COST$(X^B, X^P, i, j, m, n)$
2:    $s = (X_n^P - X_m^P)/(X_j^B - X_i^B)$
3:    $t = X_m^P - s \cdot X_i^B$
4:    $X^T = X^B \cdot s + t$
5:    $C = \sum_a \min(\min_b \|X_a^T - X_b^P\|_2, c)$
6:    # Closest(y,x) returns 1 if y is the closest point to x
7:    $C = C + \gamma \cdot \sum_b \max(1 - \sum_a Closest(X_b^P, X_a^T), 0)$
8:    Return $t, s, C$
9: end procedure

FIG. 11

INTERIOR PHOTOGRAPHIC DOCUMENTATION OF ARCHITECTURAL AND INDUSTRIAL ENVIRONMENTS USING 360 PANORAMIC VIDEOS

RELATED APPLICATIONS

This application is a DIVISIONAL of application Ser. No. 16/948,955, filed Oct. 7, 2020, which is a NONPROVISIONAL of and claims priority to U.S. Provisional Application No. 62/947,660, filed Dec. 13, 2019, each of which is incorporated herein by reference.

FIELD OF THE INVENTION

The present invention relates to methods for producing a photographic record of a site by extracting images from a panoramic video sequence, determining three-dimensional ("3D") poses of the images relative to each other and to a plan, and producing a map or model that can be used to inspect and document site conditions.

BACKGROUND

During construction and maintenance of buildings and infrastructure systems such as dams, roads, rail tracks, highways, bridges, water, and wastewater systems, a common need is to visually document the conditions of the site before, during, and after the work is performed. Such documentation was traditionally done using individual still photos that depicted areas of the site during the construction or maintenance process. Of course, this was a manually intensive process requiring hundreds or even thousands of images, each of which had to be cataloged in some fashion (e.g., by being stored in a hierarchical file and folder system). Not only did this make retrieval of an individual image difficult (one would have to know and understand the cataloging system being used), but also inefficient because the images may be stored separately from information concerning their capture time and location.

U.S. PGPUB 2019/0325089, assigned to the assignee of the present invention and incorporated herein by reference, describes systems and methods for using a set of "anchor images" of a site, e.g., calibrated images with known 3D pose relative to a 3D building information model (BIM), detecting features within images of unknown position and orientation, and determining matches with corresponding features in the calibrated images. By iteratively matching features in at least a subset of the images of unknown position and orientation and the anchor images and executing a reconstruction algorithm to calibrate the images of unknown position and orientation to the BIM, the system generates a 3D point cloud model of the site that is displayable in a graphical user interface.

While useful, the methods described in U.S. PGPUB 2019/0325089 do not take advantage of 360 degree panoramic images (henceforth, "360 images"). 360 images are now becoming used to document construction and maintenance sites. While it is still necessary for individual images to be captured over different stages of work at a given site, the use of 360 images saves time over the use of conventional still images because they provide a complete view (e.g., a panorama) of a scene from a particular position. Further, when these images are localized or positioned on a two-dimensional ("2D") drawing or 3D model of the site, they can be effectively used to visualize the progression of construction or as-built conditions of the site.

SUMMARY OF THE INVENTION

The present inventors have recognized the utility of employing 360 images in documenting construction and other sites and, accordingly, have developed methods for employing such images to aid in the visualization and comparison of "as-built" construction at such sites with planed construction. In various embodiments, the present invention provides systems and methods to produce a photographic record of an architectural or industrial site by extracting 360 images from a 360 degree panoramic video sequence ("360 video") and determining the 3D positions and orientations of the images relative to each other and to 2D drawings or blueprints or 3D computer-aided design ("CAD") or building information ("BIM") models of the site, to produce a map or model of imagery and plans that can be used to inspect or document site conditions. In some embodiments, non-360 images, e.g., captured by fixed and/or mobile cameras, may be used in addition to 360 images.

For example, in one embodiment of the present invention, a panoramic video sequence is subjected to inter-image registration using feature tracks according to a simultaneous localization and mapping (SLAM) algorithm to solve for 3D poses of keyframes within the panoramic video sequence. Each keyframe is an image in the panoramic video sequence for which a pose estimate is obtained and maintained. Following the inter-image registration, a subset of images in the panoramic video sequence is selected for extraction, for example, by preferring those of the images of the panoramic video sequence having fewer tracks in common or larger time or sequence number differences from other images.

Initial pose estimates of the extracted images are refined through correspondences between additional features in the extracted images. Optionally, these additional features may be encoded with descriptors that are suitable for determining the correspondences across large viewpoint changes. Such correspondences may be identified using an approximate nearest neighbor approach or by computing Euclidean distances in feature representations directly. Preferably, the additional feature matches between images are bidirectionally confirmed, e.g., using a ratio of distances between two most similar representations of a feature in a first image to a second image and in the second image to the first image.

From the extracted images with refined pose estimates, a sparse 3D point cloud representation of a site captured in the panoramic video sequence and relative poses of the extracted images are produced through a structure from motion ("SfM") procedure, for example, an SfM procedure that includes iterative triangulation and optimization of point and image positions.

Next, an "as-built" representation of the site captured in the panoramic video sequence may be created from the sparse 3D point cloud and aligned to a plan of the site, for example by determining a gravity direction relative to poses of the extracted images and points of the sparse 3D cloud and rotating the images to be oriented consistent with the gravity direction, fitting 3D planes to the points of the 3D point cloud, determining a ground plane orientation and extracting those planes from the 3D point cloud that are perpendicular to the ground plane. The planes so extracted (i.e., planes considered as vertical) are considered to be candidate walls of the structure for aligning to associated walls in the site plan.

If the site plan is a 2D drawing, the 3D point cloud may be converted to an as-built drawing by orthographically projecting a top-down view of the vertical planes onto the ground plane, producing a series of lines that correspond to potential walls. Endpoints for these lines are determined as the extent of 3D points that are assigned to the plane, and each 3D point that corresponds to the ground or a wall is plotted in proportion to its 2D coordinate on the ground plane. The as-built drawing is thus aligned to the plan drawing by solving for a rotation angle, 2D translation, and 1D scale, such that the transformed as-built drawing wall points are near the wall lines with the same orientation in the plan drawing.

If the site plan is a 3D CAD or BIM model, horizontal and vertical planes from the 3D plan model are extracted and aligned to horizontal and vertical planes from the "as-built" 3D point cloud, for example using point-to-plane iterative closest point ("ICP") process.

Once the alignment has occurred, the extracted images or markers representing the extracted images (e.g., thumbnail versions thereof, markers indicating locations at which the images were captured, etc.) may be rendered on a display or otherwise presented to a user in conjunction with their plan positions (e.g., overlayed on the site plan). Optionally, multi-view stereo and/or surface modeling may be employed on the extracted images from panoramic video sequence to produce a dense point cloud model of the site and/or mesh view of the site captured in the panoramic video sequence. If so performed, then along with the images, this point cloud or mesh view of the site may also be returned for the viewer.

These and further embodiments of the invention are described in greater detail below.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present invention is illustrated by way of example, and not limitation, in the figures of the accompanying drawings, in which:

FIG. 3 shows a number of images extracted from a 360 video in equirectangular format with tracked features (yellow markers).

FIG. 4 shows four sequential images from a subset of images extracted from a 360 video.

FIG. 11 reports an example of an algorithm to automatically align as-built to plan drawings.

DETAILED DESCRIPTION

Figure 1:
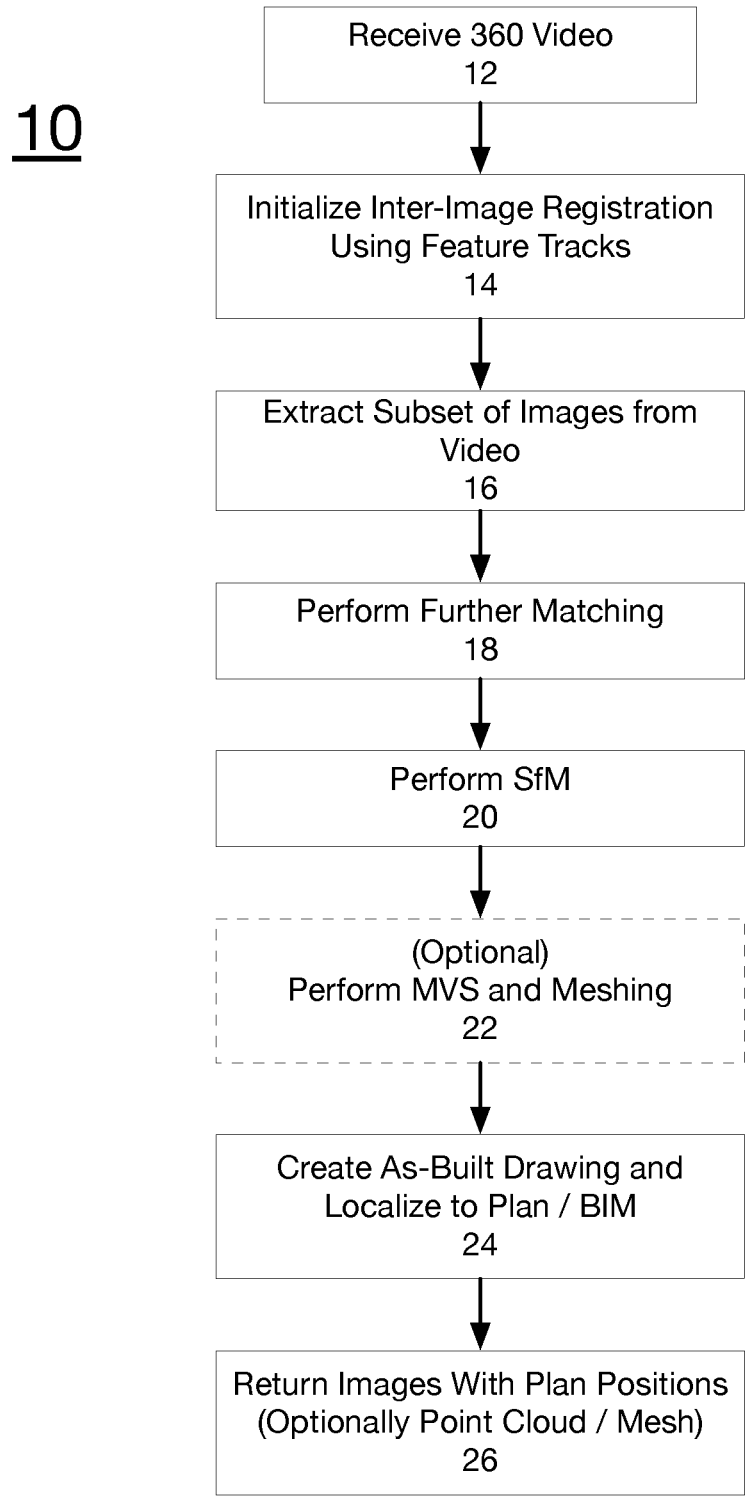
FIG. 1 illustrates a process for producing a photographic record of a site by extracting images from a panoramic video sequence, determining 3D poses of the images relative to each other and to a plan, and producing a map or model that can be used to inspect and document site conditions according to one embodiment of the present invention.

As explained in U.S. PGPUB 2019/0325089, actionable construction performance analytics enable project participants to anticipate and potentially eliminate problems as soon as possible. System and methods configured in accordance with embodiments of the present invention aid project participants in this regard by providing a visual record of a construction project, e.g., in the form of "as-built" models of completed portions of the constructions site, and comparisons of that visual record against "as-planned" versions thereof, e.g., as specified by 2D drawings or blueprints of the construction site or 3D CAD or BIM models thereof. When integrated with interfaces that facilitate visualization of the as-built models, for example, workstation- and/or web-based portals, applications, and the like, the present systems and methods may be used to produce maps or models of imagery and plans that can be used to inspect or document site conditions. In various embodiments, the system may include elements for data capture, processing, and delivery, for example via an online interactive interface accessible through client computers and/or mobile devices. Using extracted 360 images of a construction site, the system may build 3D point cloud models reflecting the actual state of work in progress at the site, and by aligning and comparing these point cloud models with 3D BIMs or other plans, the system may provide a visual indication of progress (and/or delay) at locations of the site.

As an overview, in embodiments of the present invention the position and orientations of a representative subset of frames of one or more 360 video sequences are recovered on a 2D drawing and/or 3D BIM. Additionally, as-built drawings, orthographic colored maps, and/or 3D models of the scene may be projected or overlaid on the drawing and/or BIM. A detailed description of the processes involved in such recovery and projection are set forth below, and include the following steps.

For each 360 video sequence, simultaneous localization and mapping ("SLAM"), which takes advantage of the sequence information and the small motion between frames to efficiently match features in subsequent frames, as well as limited matching across non-sequential frames, is performed to obtain a number of matched features and approximate relative positions and orientations of cameras that correspond to "key frames." A representative subset of key frames are extracted as images for further pose refinement. This subset is selected according to various preferences, for example, favoring sharp or non-blurry images and images from positions that are roughly evenly distributed within the sequence of frames.

Among the selected images, additional feature matches are found within and across all of the videos. This process may make use of conventional methods for feature detection and matching, and vocabulary trees and approximate nearest neighbor methods can be used to speed the matching process. Next, structure from motion ("SfM") processes are used for pose refinement. For example, within each video, iterative triangulation and bundle adjustment may be performed to refine the pose and 3D position of scene points that correspond to features matched across more than one image. If more than one video is present, the videos may be aligned using the feature matches between the videos, either by aligning the corresponding 3D points using RANSAC (random sample consensus) or by performing incremental SfM and bundle adjustment to initialize pose, triangulate, and adjust poses to minimize reprojection error of all matching features.

Thereafter, the vertical direction is determined, e.g., based on the scene geometry and/or the orientation information contained in the image metadata, and vertical planes are extracted, either from the scene points (i.e., a "point cloud") reconstructed during SfM or from points extracted in an optional multiview stereo step. These vertical planes can be represented as lines on a floor map. To facilitate alignment of the scene to an architectural drawing or 3D BIM, lines are extracted from such a "plan." In the case of a drawing, extraneous markings and short disconnected lines are, preferably, first removed. In the case of BIM, the vertical planes can be represented as lines on a floor map. Then, the extracted lines from the point cloud are aligned to the lines from the drawing or BIM. To refine the alignment, we solve for scales, 2D rotations, and translations that best aligns the lines from the point cloud to the lines from the plan, such that each line in the point cloud is aligned to each line in the plan (but not necessarily vice versa). Since any as-built drawing, orthographic colored map, 3D model or other derivative has known alignment to the extracted lines from the point cloud, each of these can then be aligned to the drawing or BIM transitively.

The present invention provides advantages over other systems that operate using visual records of construction and other sites. For example, whereas the systems and methods discussed in U.S. PGPUB 2019/0325089 require alignment of construction site images to previously registered "anchor images" with known pose relative to a construction site BIM, the systems and methods of the present invention require no such previously registered set of images. Instead, an as-built model developed from 360 images extracted from a 360 video is aligned directly to the as-planned BIM or other plan. In doing so, the present systems and methods make use of sequence information from the 360 video to solve for the relative poses of the extracted images.

By using SLAM we achieved improved results over alternative processes that relied only on matches between extracted images, which cannot take advantage of small motion between successive frames. This was true even when sequence information was used to restrict or guide the matching process. Further, using SfM in addition to SLAM was seen to produce better pose estimates that were provided by SLAM alone (which can lead to pose estimates that are sometimes imprecise or inaccurate due to insufficient optimization, imprecise matching, and drift). Combining SLAM and SfM in this way is unconventional inasmuch as these two techniques are usually regarded as exclusive or redundant strategies for solving for camera poses and point clouds. For example, Pagani and Stricker, "Structure from Motion using full spherical panoramic cameras", 2011 IEEE International Conference on Computer Vision Workshops (ICCV Workshops), describe registering the relative pose of images using structure-for-motion from 360 images but do not teach how to use sequence or ordering information of images to improve robustness or speed. The same is true of WO 2014/197104 of Chang et al., which also fails to address the alignment of a reconstructed scene to "as planned" drawings.

Alignment between "as-built" and "as-planned" representations of a site is difficult due to the often significant differences between a constructed scene and a modeled scene, e.g. due to incomplete construction, additional objects in the scene, and inaccuracies or deviations between the modeled and constructed scene, as well as due to extraneous text, gridlines, and other markings that may be present in an architectural drawing. As described in detail below, in embodiments of the present invention only lines putatively corresponding to walls are extracted, improving robustness to these differences and leading to correct alignment in nearly all cases that were trialed, as long as a sufficient portion of the floor was captured by the video to disambiguate any symmetric or repeated portions of a floor map.

Golparavar-Fard, "D4AR—4 Dimensional Augmented Reality—Models for Automation and Interactive Visualization of Construction Progress Monitoring", University of Illinois PhD Dissertation (2010), and U.S. PGPUB 2013/0155058 of Golparavar-Fard et al. describe automated reconstruction of point clouds from sets of unordered images for construction progress monitoring and alignment to building plans by either manually defining control points that correspond in the 3D BIM and the 3D point cloud or performing iterative closest point (ICP) analysis to align a current point cloud to a previous point cloud. In contrast, embodiments of the present invention make use of ordered images. Such ordering improves the time and robustness of reconstruction from a video or sequence of images. ICP point cloud alignment is unreliable, as it requires the point clouds to overlap and is likely to lead to error if only a portion of the point clouds overlap. The proposed method to align to building plans through the drawing as described herein provides an automated approach for alignment to both a drawing and a BIM (if the drawing has known correspondence to the BIM). This method does not use 3D correspondence between reconstructed 3D points, as does ICP, but instead finds correspondence between line segments corresponding to detected vertical planes or walls and line segments that are likely to represent walls in the drawing. Similarly, U.S. PGPUB 2015/0310135 of Forsyth et al. describes 3D reconstruction of a point cloud and alignment to BIM through a reference images, but does not address the use of sequence and ordering information through the combination of SfM and SLAM techniques and the alignment to building plans through alignment between edges in an as-built drawing to edges in an as-planned drawing.

Kaminsky et al., "Alignment of 3D Point Clouds to Overhead Images", 2009 IEEE Computer Society Conference on Computer Vision and Pattern Recognition Workshops (2009), do discuss the alignment of a 3D point cloud generated by images to an overhead orthographic image by extracting edges from the image and aligning the point cloud based on an edge cost of orthographically projected 3D points and a free-space cost based on known visibility between the 3D points and the poses of the cameras that took the images. However, this approach does not include the extraction of edges from a floor plan and orthographic projection of the as-built point cloud and alignment based on matching those edges. The present approach is especially well adapted to reconstruction of architectural scenes and greatly improves computational efficiency and robustness to spurious edges and markings that are often present in drawings as compared to alternative approaches.

As mentioned, the integration of techniques from SLAM and SfM as in the present invention provides several advantages. For example, implementations consistent with the present methods achieve faster and more robust reconstruction than SfM alone and higher precision and point cloud quality than SLAM alone. References such as, Li et al., "Spherical-Model-Based SLAM on Full-View Images for Indoor Environments", Applied Sciences 8(11), November 2018, discuss registering 360 images from a sequence or video using SLAM. While SLAM algorithms use sequence information to quickly determine the relative poses of images in a sequence, they lack precision because the design decisions favor speed over precision. SLAM algorithms typically use features that are faster to detect and match than those used by SfM algorithms, perform long-range matching more sparingly, and allow fewer iterations of bundle adjustment, often with a smaller number of tracked points and considering only a small number of image frames at a time. Our experiments confirm that the precision of SLAM algorithms is not sufficient to perform multiview stereo and produces a point cloud that is too incomplete and noisy to support alignment to a drawing or any other model. The present invention's combined use of SLAM and SfM to achieve fast, robust, and precise localization of an ordered sequence of images distinguishes it from these SLAM-only processes.

With the above in mind but before describing the present invention in detail, it is helpful to first define certain terms used herein. A 360 video is a set of time-ordered panoramic images that record light intensities of a scene along a range of 360 degrees, e.g. in a band or a full sphere, where the time-ordered images are captured in close succession to one another, typically with one second or less between images (also called frames). In some cases, time intervals between successive images may be longer. The video(s) may be obtained, for example, using one or more commercially available cameras, such as the Ricoh Theta 360, Insta360 One X, or Garmin Virb. The sequence of images is typically stored in a single computer file, for example in MP4 or other multimedia format.

A plan is a document that conveys a spatial layout of an architectural or other site. Common forms of plans are 2D drawings or blueprints, or 3D CAD or BIM models. A 3D BIM is a computer-prepared building model of a planned structure, such as an architect would prepare for generation of blueprints for a construction project. Schedule data, including the locations, start dates, and durations for a set of tasks, may be integrated with the 3D BIM by assigning elements in the BIM to tasks according to the locations of the elements and tasks. A BIM integrated with such scheduling data is referred to as a "4D BMA," wherein the fourth dimension is the scheduling data. Although the remaining discussion below makes reference to 3D BIMs, readers should appreciate that it applies equally to 4D BIMs and reference to a BIM should be understood as implicating either variant. In the absence of a design plan, the spatial layout of the site may be represented by an as-built model, such as a 3D point cloud, 3D mesh model, 2D floor/wall map, or 2D orthographic photo map ("orthophoto").

In embodiments of the present invention, the position of each image on the plan may include a 2D position, in the case of a drawing or orthophoto, or a 3D position, in the case of a CAD model, point cloud, or mesh. The position may also include an orientation so that the viewing direction within the image has a correspondence to a direction in the plan. The position may be highly accurate, such that in a 3D environment it is possible to overlay the plan on the image, or approximately so, such that the positions are used primarily as a way to organize and find the images rather than to directly compare to the plan. The position of an image relative to others provides sufficient information to visualize the position of the other images overlaid on the content of the image. For example, markers for the other images could be plotted on top of a rendering of a 360 image depicting their direction and distance relative to the position of a currently viewed image. Sufficient information may be, for example, a 3D position and orientation, a pixel position and scale value, or an orientation and distance.

Site conditions to be visualized in accordance with the present invention may include, for example, as-built conditions of a building interior or exterior, defects and areas in need of repair, progress of construction, or layout of pipes and electrical work. A marker for each image may be drawn, using a computer program, on top of the drawing, and a user may be able to access the contents of the drawing by clicking on or otherwise selecting the marker. In a 3D environment, a three dimensional marker may be drawn (or rendered), positioned within the 3D plan.

The inventors are aware of a number of existing methods for localizing and visualizing 360 images on plans. The Matterport™ service involves taking 360 images together with depth scans at corresponding positions and visualizing the image locations on a mesh model constructed from the depth scans. The Multivista™ service involves taking 360 images and manually determining their corresponding positions on a drawing. The present invention is distinguished from these approaches, in part, based on the use of a video sequence which enables reducing the time required to take the images and place them on the plan.

StructionSite™, VideoWalk™, HoloBuilder™, JobWalk™, and OpenSpace™ each offer services to position 360 images from a 360 video on a plan using a mobile app that tracks the approximate position of the camera during image capture. The present invention is distinguished, in part, by not requiring the use of such a mobile app and instead having the ability to work directly on a 360 video. In one embodiment, the present invention also is distinguished in its tracking of visual features and its approach to jointly solving for relative positions/orientations of cameras and 3D positions of features, sufficient to accurately determine the relative locations of other images and to generate 3D models based on correspondences in the images. And, the present invention is also distinguished by its ability to determine the positions of the images on the plan without requiring a user to specify the position of any image or manually correspond the video path to the plan.

SLAM and SfM (a technique that uses a series of 2D images to reconstruct a 3D scene) are well-known techniques, however, the present invention is distinguished from conventional SLAM and SfM in its use of video-based feature tracking to initialize a solution, extraction of a subset of images ("keyframes"), incorporation of additional feature matches between keyframes, and final optimization of image poses and feature 3D positions incorporating all feature correspondences. The automatic positioning of these images in relation to a pre-existing plan, such as a 2D drawing or 3D CAD/BIM, further differentiates the present invention from the above and other publicly disclosed methods.

Figure 2:
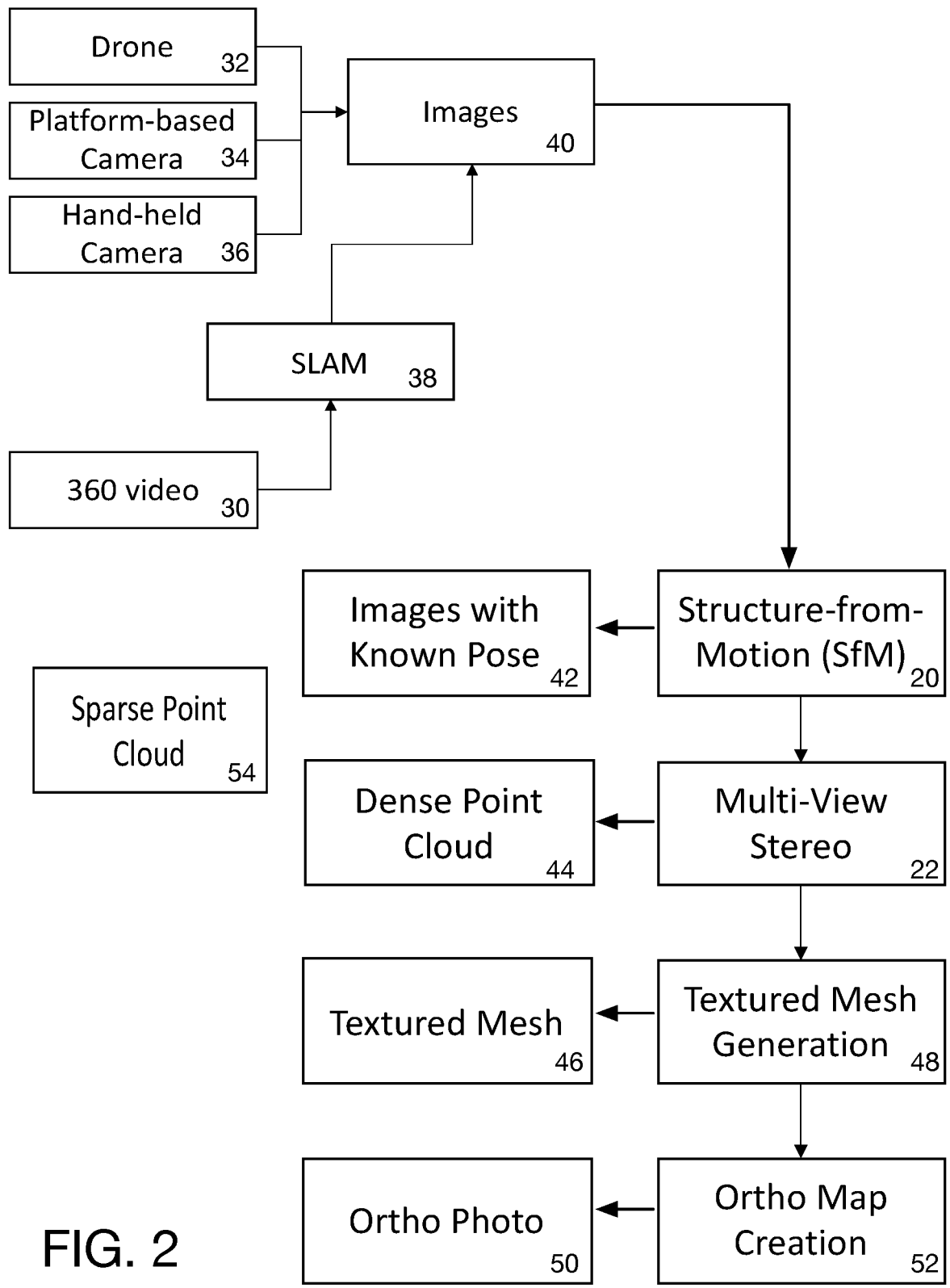
FIG. 2 is a block diagram representing inputs, processing steps, and associated outputs (deliverables) for the process illustrated in FIG. 1.

FIG. 1 illustrates a process 10 for producing a photographic record of a site by extracting images from a panoramic video sequence, determining 3D poses of the images relative to each other and to a plan, and producing a map or model that can be used to inspect and document site conditions according to one embodiment of the present invention. Various inputs, processing steps, and associated outputs (deliverables) for this process are highlighted in the block diagram in FIG. 2. At the outset, a 360 video (30) is received 12. While the present invention is primarily concerned with the use of 360 images extracted from 360 video, this is not the exclusive form of input which may be used to produce a photographic record of an architectural or industrial site. Instead, as shown in FIG. 2, other image sources, such as images from unmanned vehicles such as drones (32), platform-based (e.g., crane- or other equipment-based) cameras (34), and hand-held cameras (36), among others may be used.

Figure 12:
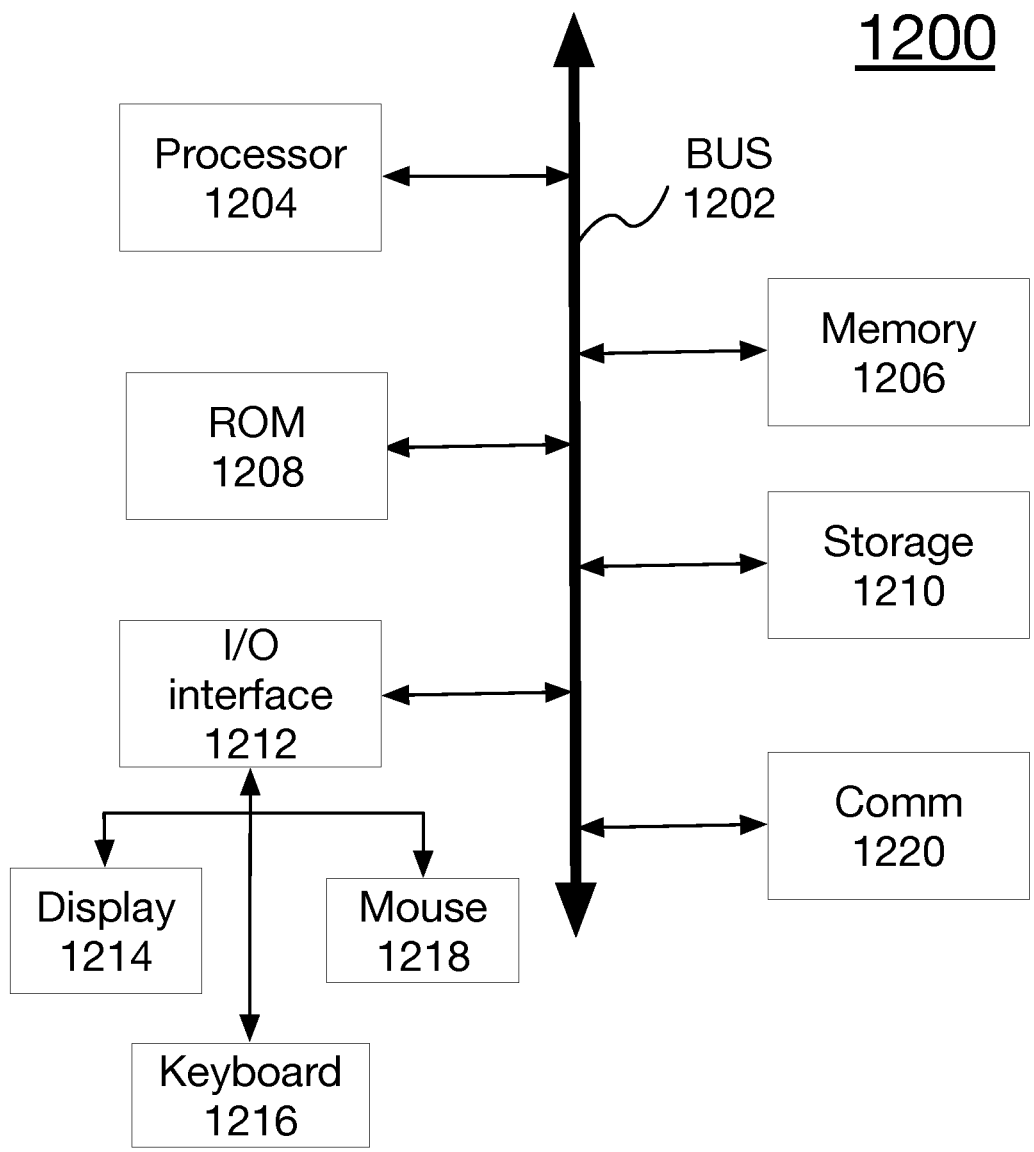
FIG. 12 illustrates an example of a computer system for receiving 360 video and/or other images and processing the 360 video and/or other images to producing a photographic record of a site in accordance with embodiments of the present invention.

The 360 video 30 may be received directly from a 360 video capture device, over a network, or through other file transfer means, by a computer system consisting of at least a storage device and a processor. FIG. 12 is a block diagram illustrating an exemplary computer system 1200 upon which an embodiment of the invention may be implemented. Computer system 1200 includes a bus 1202 or other communication mechanism for communicating information, and a processor 1204 coupled with the bus 202 for executing instructions and processing information. Computer system 1200 also includes a main memory 1206, such as a random access memory (RAM) or other dynamic storage device, coupled to the bus 1202 for storing information and instructions to be executed by processor 1204. Main memory 1206 also may be used for storing temporary variables or other intermediate information during execution of such instructions by processor 1204 as required by the methods described herein. Computer system 1200 further includes a read only memory (ROM) 1208 or other static storage device coupled to the bus 1202 for storing static information and instructions for the processor 1204. A storage device 1210, such as a magnetic disk, optical disk, or solid state drive is provided and coupled to the bus 1202 for storing information and instructions. In response to processor 1204 executing sequences of instructions contained in main memory 1206, which instructions may be read into main memory 1206 from another computer-readable medium, such as storage device 1210 and/or ROM 1208, computer system 1200 performs the process steps described herein. One or more of main memory 1206, ROM 1208, and/or storage device 1210 may be used to store a 3D BIM or other plan of a construction site, the 360 video, extracted 360 images, and other images of the site, as well as metadata concerning the features depicted in the images and pose related thereto.

Computer system 1200 may also include a display 1214 for displaying information to a user, as well as one or more input devices, such as an alphanumeric keyboard 1216, mouse 1218, etc. coupled to the bus 1202 via an input/output interface 1212 for communicating information and command selections to the processor 1204. Computer system 200 also includes a communication interface 1220 coupled to the bus 1202. Communication interface 1220 provides a two-way, wired and/or wireless data communication path for the computer system, e.g., to/from one or more computer networks and/or network of networks (e.g., the Internet), allowing computer system 1200 to send and receive messages and data such as the 360 video and other images referenced in FIG. 2.

Typically, the 360 video is received as an individual file, for example in MP4 format, that contains a series of time-ordered images in spherical or equirectangular format. Metadata may be included in the file or in a separate file or files, and may include such information as the date/time of capture, person performing the capture, and/or an indication of the approximate location of the capture. The 360 video may also be received in another format (e.g., another multimedia format) and/or in multiple files, as long as a set of images is received, such that: (1) each image can be converted to equirectangular format (where each pixel coordinate pertains to an azimuth and elevation angle); (2) a time-ordering of the images is obtainable; and (3) sequential images are taken at similar times (e.g., typically less than one second apart though in some cases the interval between successive images may be longer) so the motion between sequential images is small. As shown in FIG. 2, in addition to (or even in lieu of) a 360 video, in some embodiments non-360 images, e.g., still images captured by one or more cameras, may be used. We note that the images within a video may also be called "video frames" or "frames" without changing the meaning. The use of "images" in this document should be understood to mean visual content and metadata recorded by a camera at a particular point of time, including as part of a video or sequential image capture.

In the general case, a 360 video 30 will be received and will undergo inter-image registration using feature tracks 14. As shown in FIG. 2, this process may utilize a SLAM (simultaneous localization and mapping) algorithm 38 to solve for 3D poses of "keyframes." In the context of the present invention, "pose" is a combination of an object's (e.g., a camera's) position and orientation. Pose can be described as a rotation and translation transformation from a particular reference. A keyframe is an image for which a pose estimate is obtained and maintained. Visual features within an image, such as detected corners or textured patches, are tracked between consecutive images under an assumption of relatively small motion between sequential images. To save computation time and resources, it is sometimes possible to skip images within the sequence, for example, tracking visual features among images with only odd indices in a sequential ordering of the images. This results in "tracks" consisting of the 2D coordinates of the feature in multiple images.

FIG. 3 shows an example of such tracks. Four images extracted from a 360 video in equirectangular format are shown as views (a), (b), (c), and (d). The images depict an interior of an office. Within each view, a number of identified visual features (yellow markers) are highlighted.

Based on a set of tracks, the relative poses of the images can be determined, as well as the 3D positions of the tracked features. The pose of subsequent images that observe the same features can also be added. As features are tracked, a number of keyframes are selected. Pose is solved for the keyframes and used to guide matching and incremental pose updates in intermediate frames. The keyframes are selected to balance computational time with ensuring that the pose of each keyframe can be determined based on tracks that have been reconstructed from previous keyframes. In addition to features tracked from image to image, some matching is performed directly among the keyframes. Finding matches between non-consecutive images is known as "loop closure" and can provide constraints to reduce error that may accumulate from image to subsequent image. OpenVSLAM is one instantiation of a SLAM algorithm that may be used, but other versions of SLAM algorithms could also be used as long as they can take equirectangular images or video as input and follow similar steps to those just described.

After processing by the SLAM algorithm (38) a subset of images (40) are extracted from the 360 video (FIG. 1, step 16). Some images from the 360 video are likely to be blurry or uninformative and, therefore, not useful. Moreover, computational load and data storage requirements can be reduced by processing a smaller number of images than may be associated with an entire 360 video. Hence, a subset of images (40) from the 360 video (30) is selected, taking into account the visual content and sequence of the images. The images may also be restricted to be a subset of the keyframes selected by the SLAM algorithm in the previous step.

The visual content of the 360 video images may be assessed, for example, by computing a contrast score that measures the difference from a central pixel from surrounding pixels in multiple patches (e.g., a 3×3 or 5×5 pixel array) or that measures the variance of intensities within a patch. The average score of an image can be used to assess its blurriness, and images with high contrast (low blurriness) are preferred to be retained. Additionally, images that have significant novel content beyond other retained images are preferred. The novelty of content can be measured by the number of feature tracks in common with previously retained images, or by the timestamp difference to another image with the most similar timestamp (or equivalently, considering the distance in indices of the ordered images). Images that have few tracks in common or large time (or sequence number) differences from all other retained images are preferred.

As indicated in FIG. 2, in addition to images from the 360 video, some or all of the images captured by other platforms may be included in the retained subset of images (40). The total number of images to retain can be chosen based on a video frame rate, such as 2 images per second, and/or based on criteria for contrast, common tracks, and time differences. This means the present method also applies to sequences of images that are taken with an automated timing ("time-lapse videos or time-lapse images"). In this way, a small subset of images from the video (and, optionally, other sources) are retained, which images, in their union, depict nearly all of the visual content of the video (or, more generally, the site) while enabling the user to focus on high contrast views and reducing computational and storage loads. The further matching, structure-from-motion, and multiview stereo procedures described below are performed only on these images of the retained subset (40).

FIG. 4 shows examples of retained or selected images, in particular four sequential images from a subset of images extracted from a 360 video. Images (a), (b), (c), and (d) may be selected based on their sharpness and the number of tracks retained in common with previous images to ensure complete registration and good viewing quality.

With the selected images, further matching 18 is performed. The initial pose estimates from the SLAM algorithm are typically not sufficiently precise for multiview stereo or for alignment to a 3D plan such as a BIM. To enable more precise inter-image and inter-model alignment, additional matches (also called correspondences) are found between features (e.g., features in addition to those used in the above-described tracking). In the images these additional features are sometimes called interest points, as their locations are detected at positions corresponding to peaks of contrast or at corners in the image at multiple scales. The additional features may be encoded with descriptors suitable for determining correspondences across large viewpoint changes (e.g., changes in camera orientation by more than 15 degrees, a 50% or more difference in a distance to a scene point, or a change in position such that an angle formed by a scene point and camera position is more than 15 degrees).

The features or interest points can be described using histograms of gradients with a Scale Invariant Feature Transform (SIFT) as described by Lowe in "Distinctive Image Features from Scale-Invariant Keypoints," IJCV 2004, or similar representations. Features in one image can be matched to those in another using an approximate nearest neighbor approach or by computing Euclidean distances in feature representations directly, and matches can be initially confirmed using, for example, Lowe's distance ratio, the ratio of distance between the two most similar representations from a feature in one image to a feature in a second image. Often, a bidirectional match is desired, so that one feature in each image matches if and only if a correspondence is found by matching from the first image to the second and from the second image to the first. When two images have a sufficient number of initial feature matches, the matches are confirmed and refined using a form of model fitting (e.g., a random sample consensus or RANSAC) to select a subset of features that are consistent with an estimate of the essential matrix or the fundamental matrix. After this procedure, a tracks graph is created that incorporates feature matches both from video tracking and feature matching from interest point based feature matching.

Next, SfM is performed 20. SfM is a technique for estimating 3D structure from 2D image sequences. Relative motion between a camera and an object between successive images of the object captured by the camera reveals depth information that can be used to generate an accurate 3D representation of the object. In the present method, the feature matches represented in the tracks graph and the initial pose estimates of the images are used to refine the image pose estimates (42) in a process called bundle adjustment.

Bundle adjustment, as employed in accordance with the present invention, is a gradient descent optimization procedure to minimize the reprojection error between estimated 3D points and their observations in the images, where the reprojection depends on the tracks (encoding the observations for each 3D point), the pose of the camera for each image (encoding the translation and rotation of each camera within the same 3D coordinate system), and the intrinsic parameters of the camera. For 360 images in equirectangular format, bundle adjustment does not need to optimize over intrinsic parameters because they are already used to produce the equirectangular projection. The bundle adjustment may, for example, solve for the 3D point positions and camera poses that minimize a Huber loss on the distance between reprojected points and their observed feature positions. It may be desirable to iteratively perform bundle adjustment and re-triangulate the feature tracks based on the observation and camera pose, with suitable outlier checks such as minimum angle and reprojection error. After this step, the camera poses are precisely estimated, and a number of 3D points are estimated that correspond to scene surfaces.

Figure 5:
FIG. 5 shows the result of SfM.

FIG. 5 shows the result of the SfM process, a point cloud with localized cameras. In one embodiment of the invention, a "sparse" set of points (typically 1000 per image) are reconstructed and a model (sparse point cloud 54) is produced with 3D points and relative camera poses and parameters.

Figure 6:
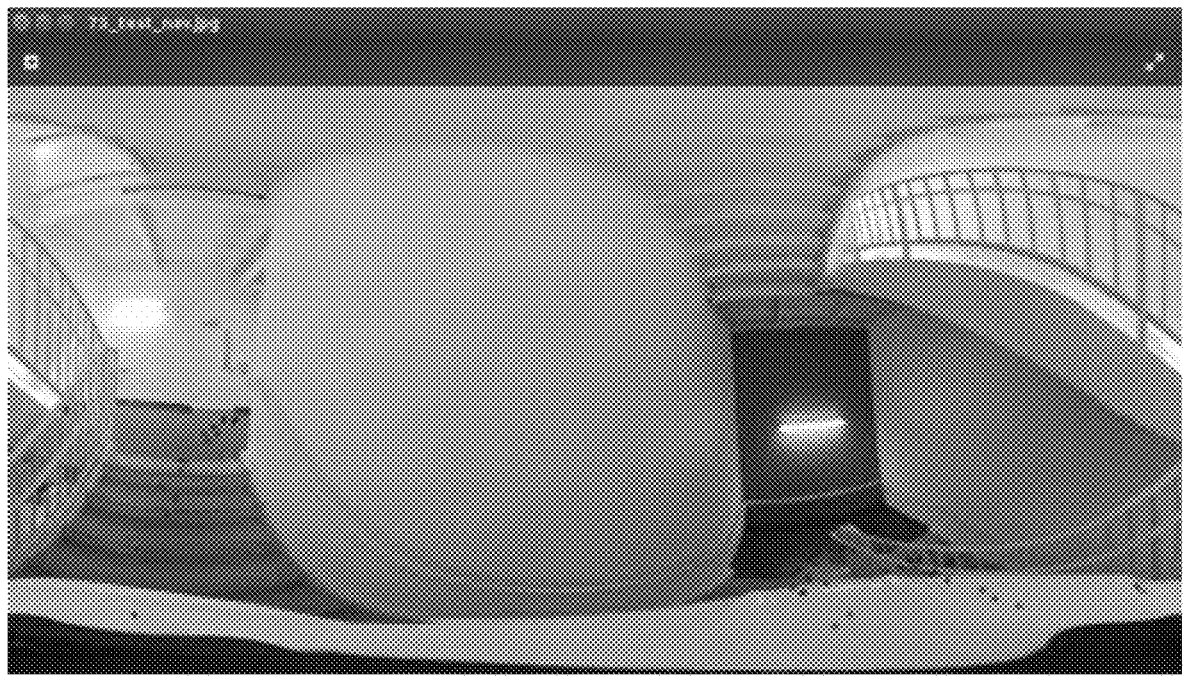
FIG. 6 shows projections of camera ground positions (blue circles) corresponding to other co-visible cameras within an image.

We consider two cameras to be co-visible if they observe at least some threshold number of common points. For each camera, the relative 3D position of each co-visible camera can be determined. FIG. 6 illustrates an example in which the blue circles in the image are projections of determined camera ground positions; that is, points determined to be directly beneath a camera on a ground plane projected into the image. This information can later be used to facilitate browsing of images via a spatial navigation tool.

If desired, multi-view stereo and surface modeling 22 may be performed. Based on the camera poses, the subset of 360 images, and, possibly, the reconstructed 3D points, a more complete or dense 3D point cloud (44) can be constructed using a multiview stereo technique. Examples of multiview stereo ("MVS") techniques are MVSNet (a deep learning architecture for depth map inference from unstructured multi-view images), MVE (a multi-view environment for SfM reconstruction), and COLMAP (a general-purpose SfM and MVS pipeline). It may be desirable to undistort the 360 images into multiple perspective images that, in union, encode all of the depicted content of the 360 image. For example, perspective images may be constructed to form a cube around the 360 image spherical surface, and the image content may be reprojected onto the perspective images. Perspective camera parameters and track graphs can be derived from the 360 camera parameters and tracks graph. The multiview stereo methods attempt to determine a depth and possibly a normal for pixels in an image by maximizing similarity of reprojected image intensities with other images, taking into account the pose of all concerned images and the depth and normal of the pixel. The result of multiview stereo may include a depth map for at least one image and a 3D point cloud (44) that represents the union of consistent depth and normal estimates for pixels within all of the selected images.

Figure 7:
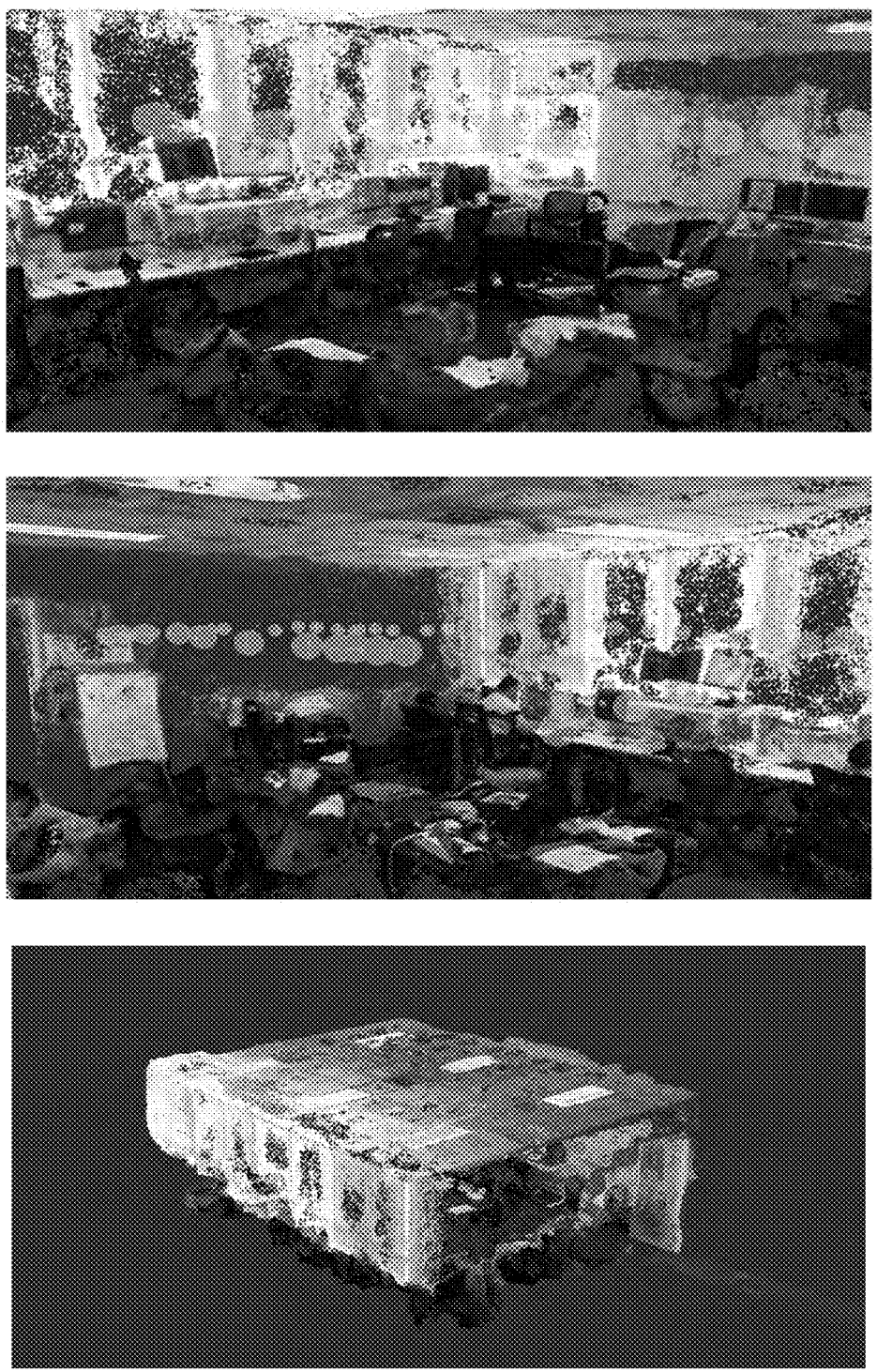
FIG. 7 shows a "dense" point cloud result from multiview stereo with camera pose locations shown as spheres.
Figure 8:
FIG. 8 shows surface mesh result from multiview stereo and surface modeling with 3D camera locations with respect to the mesh shown as spheres.

A surface model or mesh of the scene (46) can be constructed (48) from the result of multiview stereo, for example using Poisson surface reconstruction or constrained Delaunay triangulation. FIGS. 7 and 8 show examples of dense point clouds (44) and surface meshes (48), respectively. An orthographic map (50) of the scene may also be created (52) and viewed on its own, or viewed with the plan drawing using the same alignment as for the as-built drawing.

Following the SfM process (and any optional multiview stereo methods and meshing), an as-built drawing can be created and localized to the plan drawing or BIM 24. To spatially organize the photos over time and compare plans to as-built conditions, it is often desirable to align the images to the plans. The plans could be a 2D drawing or a 3D model, e.g., a CAD or BIM.

The first step for alignment is to determine the gravity direction relative to the camera poses and points of the 3D point cloud ("3D points"). The images and 3D points can then be rotated so that the "up" direction is in the same linear direction as gravity. The gravity direction may be determined based on metadata contained in the images, such as data from an accelerometer or gyroscope, and/or by fitting 3D planes to the 3D points. Often, cameras record an approximate world orientation of the camera's pose at the time each image is taken. In such cases, an average of estimates of gravity directions can be used to align the camera poses and 3D points so their up vector is consistent with gravity. Further, 3D planes can be fit to the 3D points, for example using RANSAC, by sampling a small number of points (typically 3), fitting a plane to them, determining the goodness of fit of each other point to the plane based on position and/or normal, and determining a subset of points that are sufficiently good fits. The ground plane orientation can be determined as the orientation of plane(s) that are approximately horizontal, or by assuming that the largest plane (either in area or most points assigned) corresponds to the ground. Once the ground orientation is determined, planes can be extracted from the point cloud that are perpendicular to the ground, and these planes serve as wall candidates for aligning to drawings or a 3D plan model.

Figure 9:
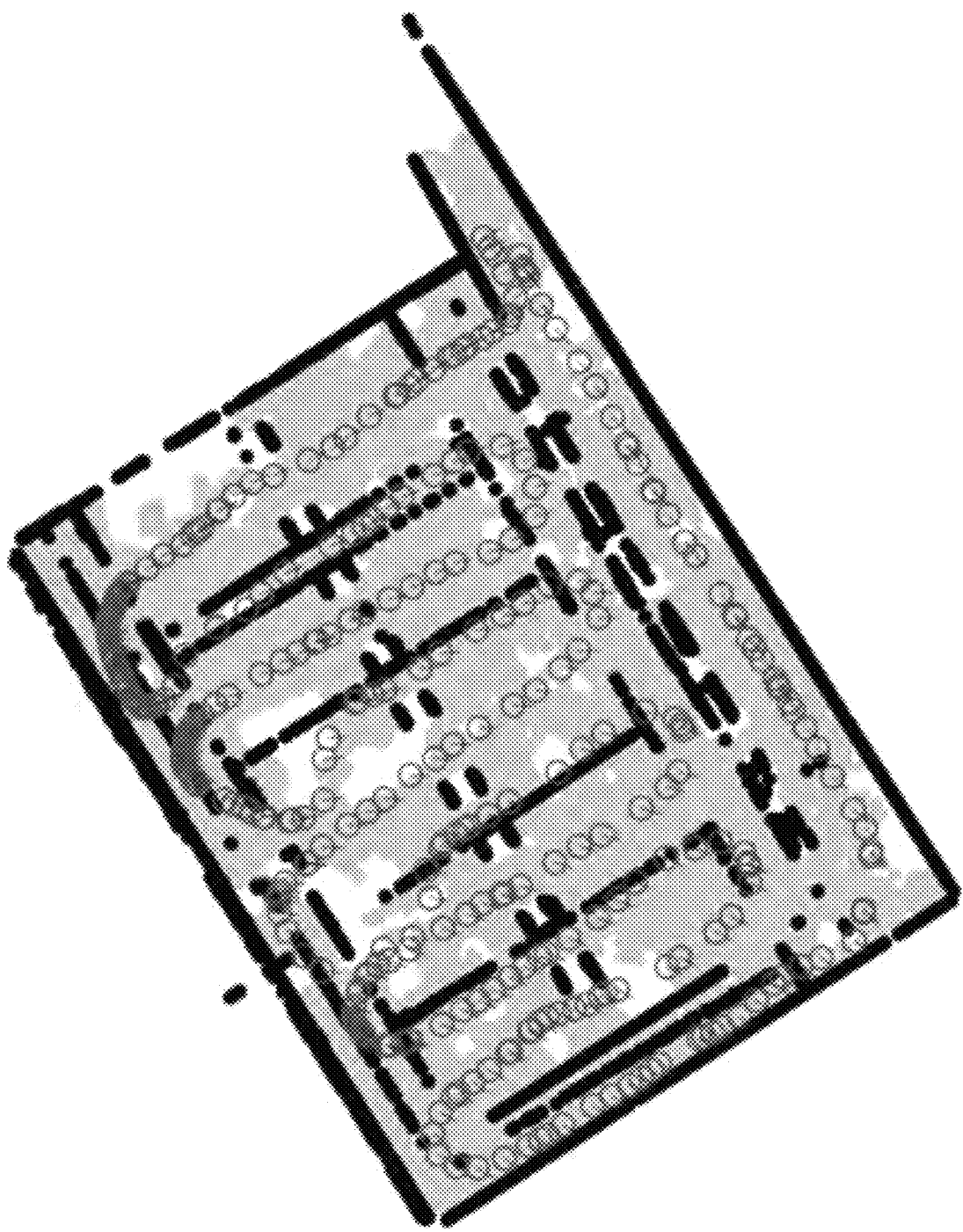
FIG. 9 shows an example of an "as-built" drawing with overlaid photo locations and orientations.

If aligning to drawings, the 3D point cloud is first converted to an "as-built drawing" by orthographically projecting a top-down view of the vertical planes onto the ground plane, producing a series of lines that correspond to potential walls. See FIG. 9 for an example. Gray dots are floor positions, black dots are wall positions, and red circles with short blue lines denote photo positions and orientations.

Endpoints for the lines are determined as the extent of 3D points that are assigned to the plane. For example, the endpoints can be determined to span the range from the 1st and 99th percentile of coplanar points after projecting them onto the line created by orthographically projecting the plane onto the ground. A graphical representation of the drawing can be created by plotting each 3D point that corresponds to the ground or a wall in proportion to its 2D coordinate on the ground plane. Points belonging to walls and ground can be plotted in different colors, so that the walls can be distinguished from the ground. Optionally, cameras can also be plotted with an icon, and possibly a directional arrow, as shown in the example. This generated drawing can be used in place of or in addition to the plan for displaying camera locations.

To align a point cloud to a plan drawing, the as-built drawing is aligned to the plan drawing. The alignment requires solving for a rotation angle, 2D translation, and 1D scale, such that the transformed as-built drawing wall points are near the wall lines with the same orientation in the plan drawing. Most lines in the as-built drawing should be present in the plan, but not vice versa because the image capture may be incomplete or the drawing may contain lines that do not correspond to walls. For simplicity, in one embodiment the present method assumes that many walls will be orthogonal to each other, as they are in a rectangular building, and the alignment may consider only the line segments that are in one of two dominant orthogonal directions. This assumption is easily relaxed in other embodiments of the invention.

An example of an alignment algorithm is provided in FIG. 11. The plan drawing is pre-processed by applying a straight line segment detector (e.g., LSD by Grompone von Gioi et al.), suppressing line segments that are unlikely to correspond to walls (e.g., based on thickness or location in the drawing sheet), and extracting segments from the two most common orthogonal directions. The alignment between the as-built drawing and plan drawing can be derived from three corresponding pairs of lines that do not all have the same orientation. With the assumption of two dominant orientations, this means the alignment is given by sampling two lines at one orientation and one line at the other orientation in each drawing and specifying one of four angles (0, 90, 180, or 270 degrees) that relates an orientation in one drawing to the other. Given the orientation θ, the problem is restricted to finding one scale s and two translations $t_x$ and $t_y$. We can consider the as-built drawing to have two ordered lists of 1D points $x_i^B \in X^B$ and $y_i^B \in Y^B$, which correspond to the sorted positions of the lines at each orientation. Likewise, for the plan drawing, there are two ordered lists $x_i^P \in X^P$ and $y_i^P \in Y^P$.

Figure 10:
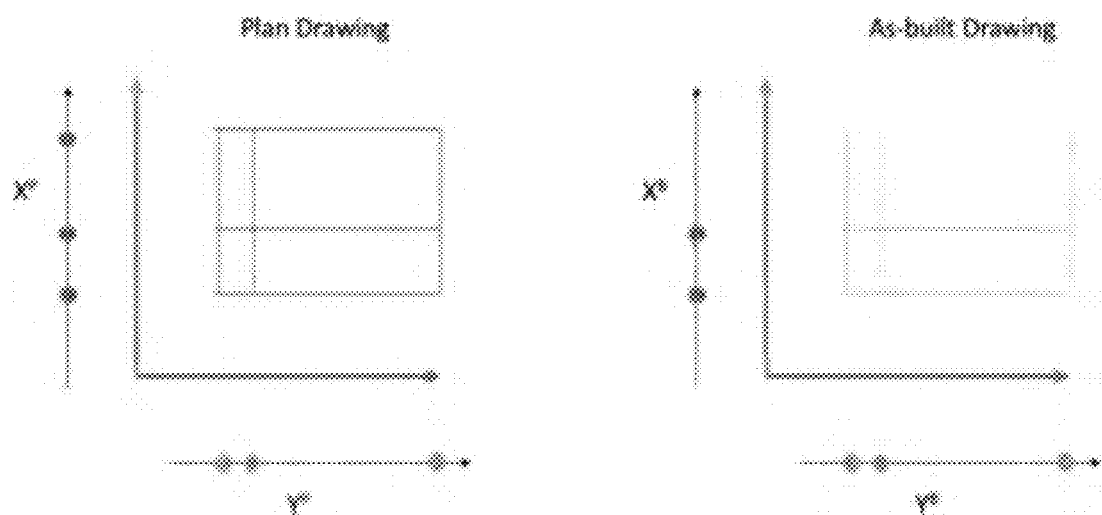
FIG. 10 is an illustration of as-built to plan drawing alignment.

FIG. 10 is an illustration of this as-built to plan drawing alignment. Detected lines in the two main orthogonal directions are represented as 1D points corresponding to their positions. After orienting each drawing so that lines are in the vertical and horizontal directions, for each 90 degree rotation, translation and scale can be determined by solving for two pairs of corresponding points in each direction that yield similar scale estimates.

More specifically, given two corresponding pairs in $Y^B$ and $Y^P$, we can solve for s and $t_y$. We, therefore, solve for s, $t_x$, and $t_y$ by finding two low-cost corresponding pairs from each set that yield similar scales. For two corresponding pairs $(x_i^B, x_j^B)$ to $(x_m^P, x_n^P)$, the scale is computed as $s_x=(x_n^P-x_m^P)/(x_j^B-x_i^B)$ and $t_x=x_m^P-s_x * x_i^B$. Similarly, from correspondences in the Y sets, we can also solve for $t_y$ and $s_y$. We compute the cost of a corresponding pair as the sum of truncated distances between transformed as-built points to plan points, with a penalty if more than one as-built point is closest to the same plan point. The best overall $t_x$, $t_y$, s is determined by selecting the minimum cost pair of transformations with $s_x$ similar to $s_y$. Alignments that have similar scores to the best alignment are refined using iterative closest point (ICP) based on points extracted from the line segments in the as-built and plan drawings.

To localize to a 3D CAD or BIM model, horizontal and vertical planes can be extracted from the 3D plan model. The 3D plan model can then be aligned to the horizontal and vertical planes from the point cloud using point-to-plane ICP. Initialization can be performed based on the drawing alignment, with multiple randomized initializations, or by proposing candidates based on triplets of orthogonal intersecting planes (i.e., corners produced by the intersections of three planes). A point-to-plane ICP method may also be used for 3D alignment.

Finally, the images with plan positions and, optionally, a point cloud or mesh (and/or an as-built drawing and as-built color map) are returned 28. At this stage, the present method provides the 3D poses of the images with respect to a 3D model. The 3D model may be a point cloud or mesh that is constructed from the images, or the model may be a 2D plan drawing or a 3D plan BIM or CAD model. The images can be viewed in a spherical image viewer. If aligned to a 3D plan, the images may be overlaid on the 3D plan to show, for example, deviances between the planned position of a building element, such as a vent, and the actual position of the element. Because the relative poses of the cameras are known, a viewer may transition between photos by clicking on an icon or representation of another image's position within the scene depicted by the currently viewed image. If the camera poses are localized to a 2D plan, the viewer may navigate between images by clicking on icons depicting the location of the images on the plan. If a 3D model has been constructed from the images, the user may perform measurements by raycasting points chosen on the images into the 3D models to pick 3D scene points and determining the distance between points or areas or volumes circumscribed by chosen points.

Thus, methods for producing a photographic record of a site by extracting images from a panoramic video sequence, determining 3D poses of the images relative to each other and to a plan, and producing a map or model that can be used to inspect and document site conditions have been described.

We claim:

1. A method of producing a photographic record of a site, comprising extracting a plurality of 360 images from a 360 panoramic video sequence, determining three-dimensional ("3D") poses of the extracted plurality of 360 images relative to each other and to a plan of the site, and producing a model of the site from the extracted plurality of 360 images, said model aligned to a plan of the site, wherein:
   the plan is one of a two-dimensional ("2D") drawing or a 3D computer aided design ("CAD") or building information model ("BIM") of the site;
   the 3D poses of the extracted plurality of 360 images are determined by first determining an approximate pose based on features sequentially tracked between sequential images of the 360 panoramic video sequence and then refined based on features matched across a subset of images selected from the 360 panoramic video sequence; and
   if the plan of the site is a 2D drawing, alignment to the plan of the site is obtained by determining correspondences between lines in the 2D drawing and lines derived from a sparse 3D point cloud produced from the subset of images selected from the 360 panoramic video sequence, said derivation performed by projecting 3D planes from the 3D point cloud determined to be perpendicular to a ground plane into lines on the ground plane, otherwise, if the plan of the site is a 3D CAD or BIM, alignment to the plan of the site is obtained by determining correspondences between points or planes derived from the sparse 3D point cloud and planes derived from the 3D CAD or BIM using ground plane projections of said points or planes derived from the 3D point cloud and ground plane projections of said planes derived from the 3D CAD or BIM.

2. The method of claim 1, wherein the subset of images selected from the 360 panoramic video sequence is a subset selected based on intensity contrast within each image of the 360 panoramic video sequence or differences between images the 360 panoramic video sequence in timestamps or spatial positions.

3. The method of claim 2, wherein positions and orientations of images within the subset of images selected from the 360 panoramic video sequence with respect to the plan of the site are obtained automatically.

4. The method of claim 1, further comprising obtaining an as-built drawing of the site automatically from the sparse 3D point cloud.

5. The method of claim 4, further comprising automatically aligning the as-built drawing to the 2D or 3D CAD or BIM.

6. The method of claim 5, wherein positions and orientations of the images selected from the 360 panoramic video sequence with respect to the as-built drawing are obtained automatically.

7. The method of claim 1, further comprising performing a multi-view stereo process on ones of the extracted plurality of 360 images to produce a dense 3D point cloud model of the site and obtaining an as-built drawing of the site automatically from the dense 3D point cloud.

8. A computer system comprising a processor coupled to a storage device, the storage device storing processor-implemented instructions for producing a photographic record of a site, said instructions for causing said processor to perform steps including:
   extract a plurality of 360 images from a 360 panoramic video sequence, determine three-dimensional ("3D") poses of the extracted plurality of 360 images relative to each other and to a plan of the site, and produce a model of the site from the extracted plurality of 360 images, said model aligned to a plan of the site, wherein:
      the 3D poses of the extracted plurality of 360 images are determined by first determining an approximate pose based on features sequentially tracked between sequential images of the 360 panoramic video sequence and then refined based on features matched across a subset of images selected from the 360 panoramic video sequence; and
      if the plan of the site is a two-dimensional ("2D") drawing, alignment to the plan of the site is obtained by determining correspondences between lines in the 2D drawing and lines derived from a sparse 3D point cloud produced from the subset of images selected from the 360 panoramic video sequence, said derivation performed by projecting 3D planes from the 3D point cloud determined to be perpendicular to a ground plane into lines on the ground plane, otherwise, if the plan of the site is a 3D computer aided design ("CAD") or building information model ("BIM"), alignment to the plan of the site is obtained by determining correspondences between points or planes derived from the sparse 3D point cloud and planes derived from the 3D CAD or BIM using ground plane projections of said points or planes derived from the 3D point cloud and ground plane projections of said planes derived from the 3D CAD or BIM.

9. The computer system of claim 8, wherein the subset of images selected from the 360 panoramic video sequence is a subset selected based on intensity contrast within each image of the 360 panoramic video sequence or differences between images the 360 panoramic video sequence in timestamps or spatial positions.

10. The computer system of claim 9, wherein positions and orientations of images within the subset of images selected from the 360 panoramic video sequence with respect to the plan of the site are obtained automatically.

11. The computer system of claim 8, wherein said instructions further include instructions for causing said processor to obtain an as-built drawing of the site automatically from the sparse 3D point cloud.

12. The computer system of claim 11, wherein said instructions further include instructions for causing said processor to automatically align the as-built drawing to the 2D or 3D CAD or BIM.

13. The computer system of claim 11, wherein said instructions further include instructions for causing said processor to automatically obtain positions and orientations of the images selected from the 360 panoramic video sequence with respect to the as-built drawing.

14. The computer system of claim 8, wherein said instructions further include instructions for causing said processor to perform a multi-view stereo process on ones of the extracted plurality of 360 images to produce a dense 3D point cloud model of the site and obtain an as-built drawing of the site automatically from the dense 3D point cloud.

15. A system, comprising a camera for producing a 360 video and a computer system coupled to receive said 360 video from said camera, said computer system including a processor and a storage device, the storage device storing processor-implemented instructions for producing a photographic record of a site from said 360 video, said instructions for causing said processor to perform steps including:

extract a plurality of 360 images from the video, determine three-dimensional ("3D") poses of the extracted plurality of 360 images relative to each other and to a plan of the site, and produce a model of the site from the extracted plurality of 360 images, said model aligned to a plan of the site, wherein:

the 3D poses of the extracted plurality of 360 images are determined by first determining an approximate pose based on features sequentially tracked between sequential images of the 360 panoramic video sequence and then refined based on features matched across a subset of images selected from the 360 panoramic video sequence; and if the plan of the site is a two-dimensional ("2D") drawing, alignment to the plan of the site is obtained by determining correspondences between lines in the 2D drawing and lines derived from a sparse 3D point cloud produced from the subset of images selected from the 360 panoramic video sequence, said derivation performed by projecting 3D planes from the 3D point cloud determined to be perpendicular to a ground plane into lines on the ground plane, otherwise, if the plan of the site is a 3D computer aided design ("CAD") or building information model ("BIM"), alignment to the plan of the site is obtained by determining correspondences between points or planes derived from the sparse 3D point cloud and planes derived from the 3D CAD or BIM using ground plane projections of said points or planes derived from the 3D point cloud and ground plane projections of said planes derived from the 3D CAD or BIM.

* * * * *